July 22, 1941.  G. H. ENNIS  2,249,815
APPARATUS FOR TESTING AND SAMPLING WELL FLUID
Filed March 9, 1938  3 Sheets-Sheet 3
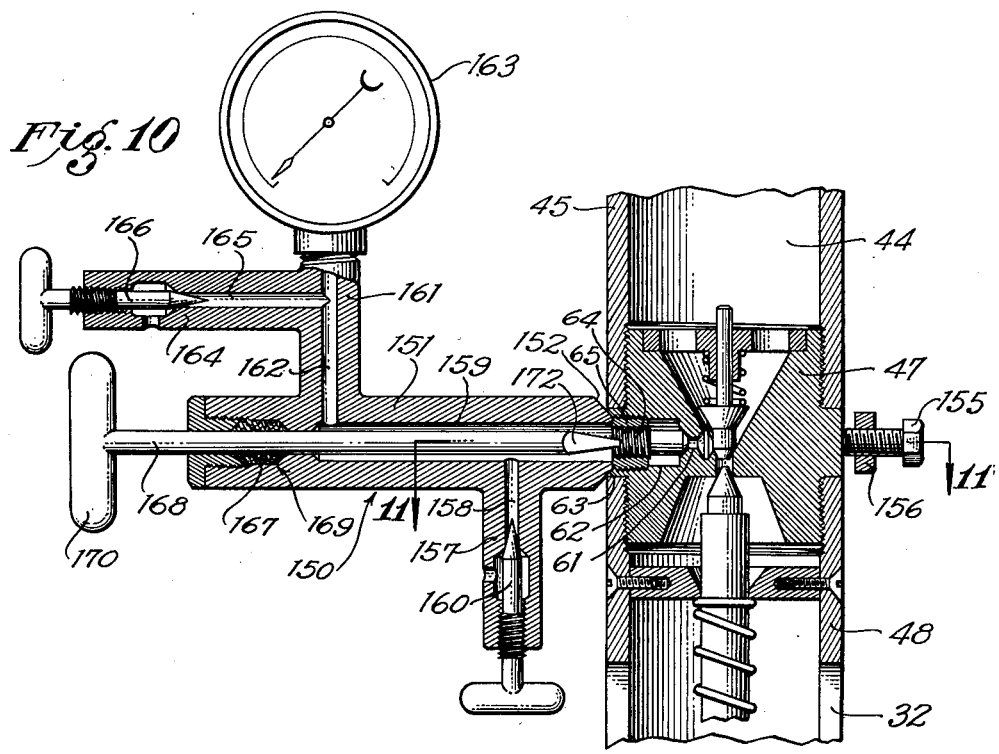
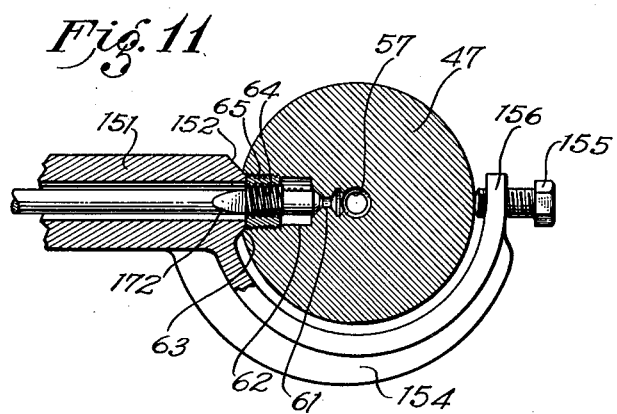
GEORGE H. ENNIS,
INVENTOR.
BY
ATTORNEY Patented July 22, 1941

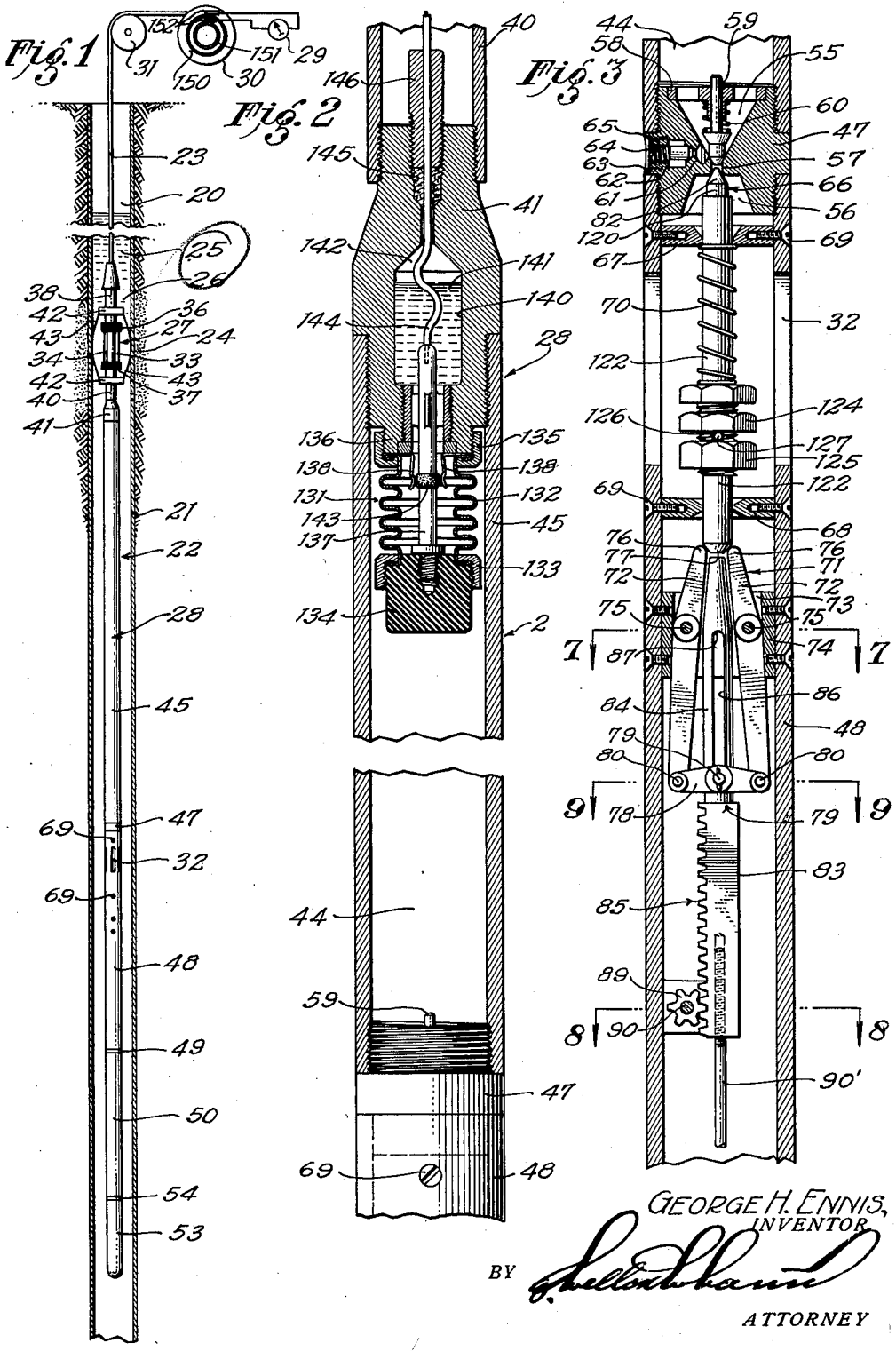
July 22, 1941.     G. H. ENNIS     2,249,815
APPARATUS FOR TESTING AND SAMPLING WELL FLUID
Filed March 9, 1938     3 Sheets-Sheet 1
GEORGE H. ENNIS, INVENTOR
BY
ATTORNEY

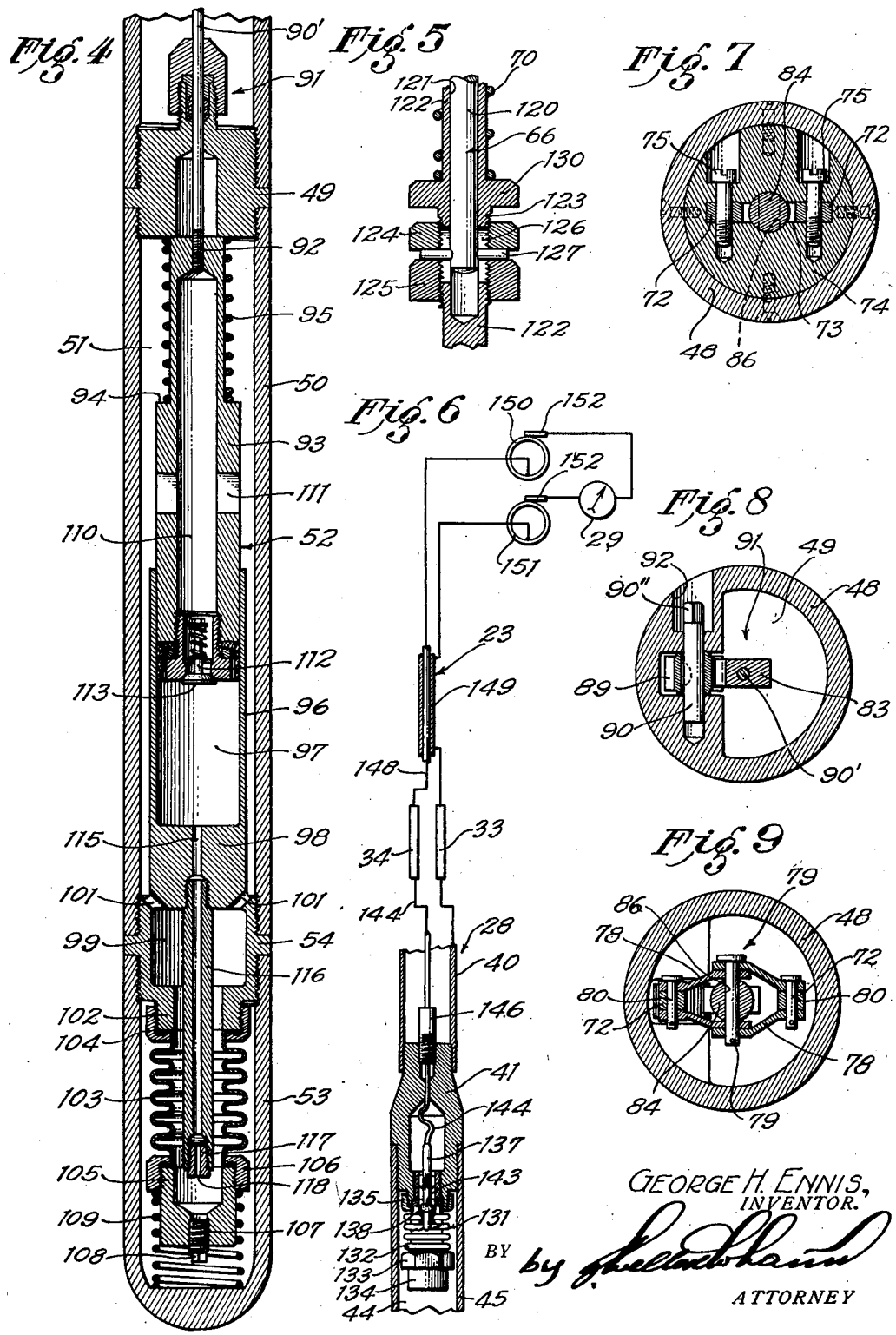

2,249,815

UNITED STATES PATENT OFFICE 2,249,815

APPARATUS FOR TESTING AND SAMPLING WELL FLUID

George Henry Ennis, Long Beach, Calif., assignor of one-half to Robert V. Funk, Long Beach, Calif.

Application March 9, 1938, Serial No. 194,864

13 Claims. (Cl. 166—1)

My invention relates in general to testing methods and devices for use in wells to gain information as to conditions existing in said wells, and relates in particular to a method of testing and a testing device having means for obtaining a sample of the fluid in the well where the test is made to enable a more accurate determination of the condition existing in a well.

To provide an example of the general utility of my invention I shall refer to the art of locating the point of leakage of water into wells, although the invention is not limited to this purpose. By observation of the fluid content of a well it is possible to locate points at which water is leaking into a well. Herein the term "observation" with respect to fluid in a well is intended to mean the noting or determining of characteristics of the fluid, and an observation is ordinarily made with the assistance of an instrument referred to herein as an "observation instrument." In this art it is customary to condition the well by placing therein a body of fluid having known characteristics and to then cause entry of water into the well by reducing the head of the fluid contained in the well which allows an inflow of leakage fluid into the well. An observation instrument is then moved through the fluid in the well, such observation instrument having means which acts in response to conditions in, or changes in condition of, the contents of the well to produce sensible indications which may be transmitted to an indicating or recording instrument connected to the observation instrument in the well either by direct electrical connection or otherwise. Observation devices of the type referred to hereinabove may be made in various ways, and they may operate on mechanical, optical, electrical, or electro-chemical principles. These observation devices include the following: a device having a pair of electrodes connected through conductors with a meter situated at the top of the well, the fluid in the well constituting an electrolyte having an electro-chemical action on the electrodes to produce a flow of current or an electrical potential in the circuit; a device having electrodes adapted to be lowered into the fluid in the well and forming a part of a circuit having a battery or other electro-motive source therein, the resistance of the circuit being varied by the change in the condition of the fluid disposed between the electrodes and being recorded by a suitable instrument; a device having means for producing radiant energy, and an element responsive to this radiant energy, spaced apart so that fluid in the well may pass therebetween, the changes in the value of the radiant energy passing through such material being noted on an indicating means at the top of the well; and a device having a motor driven impeller adapted to be moved from one position to another within the well, there being associated means for measuring the power required to drive the impeller and to thereby give an indication of the consistency of the fluid encountered by the impeller.

It is an object of my present invention to provide a device which includes an observation instrument for the general purpose set forth in the foregoing paragraph and a means for taking a sample of fluid from the zone in the well in which an observation is made.

It is a further object of the invention to provide a device including an observation instrument and means for taking in the well a sample of fluid and holding such sample under the pressure at which it is received from the well, so that not only can the characteristics of the fluid be noted, but also the pressure may be recorded.

It is a further object of the invention to provide a device of this general character having a receptacle to receive a sample and means for producing a signal perceptible to an operator at the top of the well that such sample has been received by the receptacle.

My invention makes it possible to obtain information by direct observation in a well and to check or corroborate the information obtained by the use of the observation instrument. It is known that readings obtained from instruments of this general character may be influenced by certain conditions so that the information obtained from a reading may be deceptive. For example, in the optical type of observation instruments, the presence of oil may cloud the lenses of the device so that it may produce readings which are in error. In my invention, when the observation instrument produces information that a sought condition exists in a well, a sample of fluid from the zone of this observation may be taken, this sample being checked at the top of the well against the observation to corroborate, supplement, or negate the information given by the observation device.

An object of the invention is to provide a method and a means whereby an observation may be made in a known zone in a well and a sample of the fluid of which the observation has been made may be taken so as to determine characteristics of the fluid which may not be shown by the observation instrument. For example, an emulsion of oil and water may be entering the well in a given zone. The observation instrument will show the entry of the water in this zone, and in ordinary practice this part of the well would be cemented off, thereby closing off potential oil production. In the use of my invention, under such circumstances, this entry of emulsion into the well will be noted from an inspection of the sample which is taken substantially coincident with the making of the observation of the oil and water emulsion in the given zone in the well. With this supplemental information at hand, the well operator may decide whether or not to cement off the formation from which the emulsion is entering the well, or remove the emulsion from the well and separate the oil from the water. The use of the invention is not limited to locating points of entry of water into the well, but is also useful in determining the location of points of entry of oil, or other fluids, into the well.

It is also an object of the invention to provide a device of the character set forth hereinabove having in combination with observation means a receptacle adapted to take a sample of fluid from a zone in the well wherein an observation has been made, this receptacle having valve means for excluding fluid from the receptacle and means for effectuating the opening of this valve means at a desired time so as to admit a sample into the receptacle.

It is a further object of the invention to provide a receptacle having an opening communicating with the exterior, a valve to close this opening, and time control means for effectuating the opening of the valve at a prescribed time after the receptacle has been lowered into the well.

A further object of the invention is to provide a device of the character set forth in the preceding paragraphs having means for indicating to an observer that the opening of the valve of the receptacle within the well has been effectuated.

A further object of the invention is to provide a device of the character herein set forth, having a receptacle and means for indicating to an observer at the top of the well if fluid has leaked into the receptacle.

Further objects and advantages of the invention will be brought out in the following part of the specification.

Referring to the drawings which are for illustrative purposes only:

Fig. 1 is a view showing a preferred form of my invention in a well.

Fig. 2 is an enlarged fragmentary section of the upper part of the sample taking device shown in Fig. 1 as forming a part of the present invention.

Fig. 3 is an enlarged fragmentary section of the intermediate portion of the sample taking device.

Fig. 4 is an enlarged fragmentary section of the lower portion of the sample taking device.

Fig. 5 is an enlarged fragmentary sectional view showing details of the receptacle valve.

Fig. 6 is a schematic view showing the electrical circuit of the preferred form of my invention.

Fig. 7 is a cross-section taken on a plane indicated by the line 7—7 of Fig. 3.

Fig. 8 is a cross-section on a plane indicated by the line 8—8 of Fig. 3.

Fig. 9 is a cross-section on a plane indicated by the line 9—9 of Fig. 3.

Fig. 10 is an enlarged fragmentary sectional view showing my bleeding and pressure testing device applied to the sample receiving receptacle.

Fig. 11 is a fragmentary cross-section taken as indicated by the line 11—11 of Fig. 10, and showing the bleed valve of the receptacle open.

In Fig. 1, I schematically show a well 20 which may have a casing 21 set therein. For the purpose of making a test within the well in order to obtain information indicating conditions within, or of the well, I have shown a testing device 22 supported therein by means of a cable 23. To illustrate the principles of the invention in order that the art may adapt the same to the relatively wide range of uses characteristic of the invention, I have indicated a water producing stratum 24 outside a portion of the casing 21. This may be one of a number of strata from which leakage into the well occurs. To determine the position of said stratum 24 and the character of fluid which is entering the well therefrom I may employ my invention in the following simple way.

The first step in making the test is preferably to condition the well by placing therein a fluid or mixture of known characteristics, which may be referred to as the electrolyte 25. Entry of fluid into the well from surrounding strata may be then accomplished, as by reduction of pressure in the well, the result being that fluid will flow into the zone 26 of the well 20 from the stratum 24 if there is an opening through the wall of the casing 21 communicating with such stratum 24. The testing device 22 may be then moved within the well until an observation is obtained which indicates that a zone has been reached by the device 22 in which the characteristics or conditions of the electrolyte 25 has been changed or in which the electrolyte has been displaced by another fluid.

The testing device 22 includes an observation element 27 and a sample taking means 28 in cooperative relation thereto. The observation element 27 is a means whereby the condition of the contents of the well 20 may be observed or noted. When the element 27 is moved into the zone 26 of the well 20, the pressure of excess water in the electrolyte, or the displacement of the electrolyte by water or a mixture of water and other fluid, will be noted on an indicating instrument 29 situated at or near the top of the well 20 and having suitable electrical connection with the observation element 27. The level at which this observation is taken may be noted by reference to length of cable 23 which has been run from the drum 30 and over the sheave 31 into the well. The testing device 22 may then be raised a short distance to bring inlet ports 32 of the sample taking means 28 into the position occupied by the element 27 at the time of making the observation. A sample of the fluid content of the zone 26 may be then taken into the sample taking device 28, to be removed thereby to the top of the well for inspection and for correlation to the observation made by the device 27. The observation obtained from the element 26 indicates to the observer that in the zone 26 of the well 20 there has been a change in the fluid content. At the time of making the observation the fluid or mixture present in the zone 26 is not known with certainty to the observer. He may surmise from the action of the indicating instrument 29 that water has entered the zone 26, but when the device 22 is pulled to the top of the well and the sample taken by the member 28 is noted, the observer will have complete information as to the condition existing in the zone 26. The sample will show whether water alone, oil, or a mixture of oil and water has entered the zone 26 from the adjacent stratum. Naturally, if water alone is entering the zone, a cementing job is indicated, but should the entering fluid consist of an emulsion containing an appreciable amount of oil, the operator possibly will not cement off this zone but will produce from the same.

The specific form of testing device in Fig. 1 includes a pair of electrodes 33 and 34, which may be respectively made from zinc and gold and which may be held in suitably spaced relation by upper and lower insulators 36 and 37. A tube 38 extends upwardly from the upper insulator 36 and by means of a socket 39 the cable 23 is connected thereto. A tube 40 extends downwardly from the lower insulator 37 and makes threaded connection with a fitting 41 forming the upper end of the sampling device 28. By means of collars 42 on the tubes 38 and 40, spring guide members 43 are secured in positions vertically transversing the electrodes 33 and 34 of the observation element 27.

As shown in Fig. 2, the sampler 28 of the testing device 22 comprises a receptacle 2 incorporating a sample receiving chamber 44. To form this receptacle 2 a tube 45 is extended downwardly from the fitting 41, and a valve fitting 47 is threaded into the lower end thereof. As shown in Fig. 3, a tube 48 is extended downwardly from the valve fitting 47 and into the lower end of the tube 48 a fitting 49, shown in Fig. 4, is threaded so as to provide a means for detachably connecting to the tube 48 a tube 50 which forms fluid chamber 51 for the timing device 52 of the invention. A cup 53 is connected to the lower end of the tube 50 by means of a threaded fitting 54.

As best shown at the top of Fig. 3, the valve fitting 47 comprises upper and lower valve chambers 55 and 56 connected by a vertical opening 57. By means of a spider 58 a check valve member 59 is supported in a position to close the upper end of the valve opening 57, there being a compression spring 60 for urging the check valve member 59 downwardly into closing engagement with the valve seat formed at the upper end of the passage 57. A valve port 61 communicates with one side of the chamber 55, the other end of this port 61 leads to a threaded counter-bore 62 having a conical seat 63 at the outer end thereof. The lateral port 61 is normally closed by a valve screw 64 which threads through a bushing 65 in the outer portion of the counter-bore 62.

A control valve 66 is carried in the upper part of the tube 48, and is guided for vertical movement by inserted guides 67 and 68 which are held in place by means of radially disposed machine screws 69. The control valve 66 is adapted to be held in raised position against the downward force of a compression spring 70 by latch means 71 which engages the lower end thereof.

The latch means 71 comprises a pair of levers 72 supported in diametral slots 73 in a body 74 by means of transverse pivot pins 75. The upper ends of the levers 72 comprise jaws 76 which engage diametrally opposed portions of a conical face 77 on the lower end of the valve member 66. The jaws 76 are supported in this relatively closed relation by means of a toggle comprising a pair of toggle links 78 which are pivotally connected to a central transverse pin 79, and the outer ends of which links 78 are connected by pivot pins 80 with the lower end of the levers 72. In Fig. 3, the toggle links 78 are shown in extended relation, with the central pin 79 in a horizontal plane slightly above the horizontal plane defined by the pin 80. When the pin 79 is forced downwardly from the position in which it is shown, the toggle formed by the links 78 will be collapsed and the lower ends of the lever 72 will be permitted to swing inwardly toward each other, separating the jaws 76 so as to provide a space therebetween into which the lower end of the valve member 66 may drop, under force of the spring 70, thereby removing the upper conical end 82 of the valve member 66 from closing relation to the valve opening 57.

The extending and collapsing of the toggle is accomplished by a vertically movable traveller 83 which is connected to the timing device 52 in a manner which will be hereinafter described. This traveller 83 has an upper rod portion 84 and a lower rack portion 85. The rod portion 84 has a vertical slot 86 through which the toggle pin 79 passes, as shown in Fig. 9. When the traveller 83 is moved downwardly, the wall or shoulder 87 forming the upper end of the slot 86 will engage the pin 79 and displace the same downwardly, thereby collapsing the toggle formed by the links 78 and effectuating release of the latch means 71 and opening of the valve 66. When the traveller 83 is moved upwardly, after the toggle has been collapsed, the wall at the lower end of the slot 86 will engage the pin 79, thereby to move the same into the raised position in which it is shown in Fig. 3, and to extend the toggle links with the effect of resetting the latch means 71. For the purpose of raising the traveller 83 I have provided a pinion gear 89 supported on a shaft 90 in position to engage the rack member 85. The shaft 90 has a deformed outer end 90″ which, as shown in Fig. 8, is disposed in an external recess 92 in the tube 48 so as to be engaged by a suitable key.

The traveller 83 is connected to the timing device proper 52 by means of a rod 90′ which extends downwardly from the rack member 85 through a packing gland 91 disposed on the upper part of the fitting 49. The lower end of the rod 90′ is connected at 92 to the upper end of a piston member 93 which is of tubular form and has an upwardly presented shoulder 94 against which a compression spring 95 exerts a downward force. The lower portion of the piston member 93 extends into, and is vertically slidable in, a cylinder 96 which projects upwardly from the fitting 54 disposed at the lower end of the tube 50. The cylinder 96 encloses a fluid chamber 97 which is separated by a wall 98 from a fluid space 99 formed within the fitting 54. The fitting 54 is provided with upper diagonal ports 101 which connect the space 99 with the fluid chamber or reservoir 51 within the tube 50 and surrounding the cylinder 96 and the exposed portion of the piston member 93.

The lower portion of the fitting 54, Fig. 4, has a threaded tubular extension 102 to which an expansible member 103 is connected by means of a nut 104. This expansible member 103 forms a part of the fluid reservoir and is connected to the fluid space 99 through the tubular extension 102. This expansible member 103 is preferably a corrugated metal bellows and the lower end thereof is connected to a plug 105 by means of a nut 106, this plug or body 105 having a filling opening 107 therein which is closed by a threaded plug 108. A compression spring 109 is placed in the lower end of the cup 53 in such position that it will surround the body 105 and will force upwardly against the nut 106, thereby tending to collapse the expansible bellows member 103, which will have the effect of constantly maintaining the fluid in the reservoir 51 under pressure. It will be recognized that as the fluid in the reservoir 51 expands and contracts due to changes in temperature, the body 105 will move downwardly and upwardly to compensate for such expansion and contraction.

The piston member 93 has a vertical passage 110 which communicates with the reservoir 51 through radial openings 111. An inlet check valve 112 is positioned in the lower end of the passage 110, this inlet valve 112 having a spring closed closure member 113 which opens downwardly to permit fluid to pass from the passage 110 into the chamber 97. The wall 98 at the lower end of the chamber 97 has a vertical fluid passage 115 therethrough which communicates with the interior of a tube 116 which extends downwardly from the wall 98 into the expansible member 103 and in the lower end thereof has a replaceable plug 117 provided with a metering or fluid escape orifice 118.

Prior to the lowering of the testing device into the well, the timing device 52 is set by the lifting of the piston member 93 against the action of the spring 95, this being accomplished through rotation of the pinion 89. As the piston member 93 is moved upwardly fluid, such as a light oil, passes inwardly through the radial openings 111 from the reservoir 51, and then travels downwardly through the lower part of the passage 110 and past the closure member 113 of the inlet check valve 112 into the chamber 97. When the lifting effect of the gear 89 is discontinued, the force of the spring 95 tends to move the piston member 93 downwardly, but the speed of downward movement of the piston 93 is controlled by the rate of flow of fluid from the chamber 97 through the orifice 118. The cooperative parts of the timing device may be proportioned so that the piston will move downwardly through its entire distance of travel in any prescribed period of time.

As shown in Fig. 5, the valve member 66 is made so as to be adjustable in length. Accordingly, this valve member 66 comprises an upper pin portion 120, which has the conical formation 82, and extends into a vertical opening 121 drilled downwardly in the lower body or outer member 122 of the valve 66. The outer member has an externally threaded portion 123 to receive adjustment nuts 124 and 125. In this threaded portion 123, the outer member 122 has diametrally opposed vertical slots 126 through which a transverse pin 127 projects, this pin 127 being seated in the lower part of the member 120 and being of such length that the ends thereof will project outwardly between the nuts 124 and 125. A head 130 is placed at the upper end of the threaded portion 123 to receive the downward thrust of the spring 70. The adjustable relation of the parts 120 and 122 of the valve member 66 permits the adjustment of the member 66 to proper length and so that the conical upper end 82 of the member 120 will be firmly seated in the lower end of the valve opening 57, after the latch means has been set, that is to say, after the valve member 66 has been raised and the jaws 76 have been brought together into a position to engage the conical face 77 at the lower end of the member 122. In the setting of the valve 66 and the latch means 71, it may be found desirable, prior to the closing of the jar, to shorten the valve member 66, which may be accomplished by screwing the nut 125 downwardly a short distance, which will permit the member 120 to drop a like distance within the outer member 122. Then, after the jaws 76 of the latch means 71 are brought into closed relation and into engagement with the face 77, the nut 125 may be screwed upwardly on the threaded portion 123 to force the upper end 82 of the member 120 tightly into engagement with the valve seat at the lower end of the opening 57.

As shown in Figs. 2 and 6, a pressure responsive means 131 is associated with the sample receiving chamber 44, to serve as a means for indicating the opening of the valve 66. This pressure responsive means 131 comprises a metal bellows 132, the lower end of which is secured by means of a nut 133 to a body of insulation 134, and the upper end of which is connected by means of a nut 135 to an annular threaded wall 136, forming an internal part of the fitting 41. A metal bar 137 projects upwardly from the body of insulation 134, and passes between spring contacts 138 which are grounded to the fitting 41 which is in turn connected to the tube 40. The interior of the bellows 132 and a portion of the chamber 140 within the fitting 41 are filled with insulating fluid such as transformer oil 141, there being an air space 142 above the body of oil 141. The rod 137 has an annular insulator 143 thereon which normally engages the spring contacts 138 and holds them out of engagement with the rod 137. An insulated conductor 144 is connected to the upper end of the rod 137 and is carried through a packing gland 145 and a gland nut 146 into the tube 40, and as diagrammatically shown in Fig. 6, this conductor 144 is connected to the electrode 34 which is in turn connected to a conductor 148 which extends within the cable 23 in insulated relation to the sheath 149 of the cable, which sheath may be referred to as the ground conductor.

The conductor 148 may be connected to a collector ring 150 and the sheath 149 of the cable 23 may be connected to a collector ring 151, the electric meter 29 being connected to the rings 150 and 151 by means of brushes 152. The sheath 149 is connected to the electrode 33, which may be referred to as the ground electrode, and the metal structure of the sample taking device 28, including the contact features 138, is grounded to the sheath 149. When the testing device 22 is lowered into the well, and opening of the valve 66 is effectuated by release of the latch means 71, fluid from the well will flow past the valve 59 into the chamber 44, and the increase in pressure in the chamber resulting therefrom will force the body 134 upwardly. This will move the rod 137 upwardly to carry the insulation 143 into the position in which it is shown in Fig. 6, permitting the contacts 138 to engage the rod 137 and thereby forming a direct electrical connection between the electrodes 33 and 34. Such shorting of the electrical circuit will cause an abrupt change in the readings shown by the meter 29 and will indicate to an observer at the top of the well that the valve 66 has opened and that a sample has entered the chamber 44. The device 22 may be retained in sample receiving position for a short period of time to assure the building up of the pressure in the chamber 44 to substantially the pressure existing in the well externally thereof. Then the testing device 22 may be raised to the surface of the ground to bring to the observer the sample retained under pressure in the chamber 44 due to the closing of the check valve 59. Indicating means represented by the bellows 132, and the parts associated therewith, serves as a constant check on the sample receiving chamber 44 and the valve 66 associated therewith. Should the valve 66 be improperly set so as to permit leakage of fluid into the chamber 44, or should there be a premature release of the valve 66, the same will be indicated by the meter 29 at the top of the well.

The observation element 27 disclosed in this preferred embodiment of the invention is of the electro-chemical type having electrodes 33 and 34 of dissimilar metal between which fluid or electrolyte in the well generates an electrical potential, the changes in which are recorded on the meter 29. When the contacts 138 engage the rod 137 so as to form a short-circuit across the electrodes 33 and 34, the indicator hand of the meter 29 will drop to zero. In the resistance type of observation device a battery, or other source of electrical potential, is connected into the circuit which includes the electrodes 33 and 34, and the observation in the well is obtained by measuring the conductivity of the liquid disposed between the electrodes. In such a device, the short-circuiting of the electrodes, as a result of engagement of the contacts 138 with the rod 137, will result in an upward movement of the indicator hand of the meter 29.

In Figs. 10 and 11 I show the cooperative means of the invention for measuring the pressure of fluid in the sample receiving chamber 44 and for releasing the sample into a suitable receptacle. For this purpose I show an attachment 150 comprising a tubular barrel 151 having a conical face 152 at the forward end thereof to engage the conical seat 63 at the outer end of the counter-bore 62 which forms a part of the discharge passage of the chamber 44. To hold the conical face 152 in fluid tight engagement with the seat 63, a yoke 154 is connected to the barrel 151 in such position that it will extend substantially half way around the fitting 47. A clamping screw 155 is threaded through the outer end 156 of the yoke 154 in position to engage the fitting 47 at a point diametrally opposite the conical seat 63. A branch pipe 157 extends downwardly from the forward end of the barrel 151, and is provided with a discharge passage 158 which communicates with the front end of the passage 159 of the barrel 151, there being a needle valve 160 for closing the passage 158.

A second branch pipe 161 extends upwardly from the barrel 151 so as to communicate with the outer end of its passage 159, this branch pipe 161 having a passage 162 which communicates with a pressure gauge 163 mounted at the extremity of the branch pipe 161. A discharge member 164, having a discharge passage 165 therein, leads from the upper end of the branch pipe 161, and a needle valve 166 is provided for closing this passage 165. At the outer or left end of the barrel 151 an opening 167 is provided in alignment with the passage 159 through which a valve releasing member 168 may be extended. A packing device 169 is provided around the member 168 to prevent leakage of fluid through the opening 167. The releasing device 168 comprises a rod which is axially slidable and which may be rotated by means of a handle 170 at its outer end. The inner end 172 of the member 168 is formed for engagement with the screw 64 whereby rotation may be transmitted through the member 168 to the screw to withdraw the same, thereby permitting fluid to pass through the port 61 and the counterbore 62 into the passage 159 of the attachment 150. The pressure of this release fluid will be immediately transmitted through the passage 162 to the pressure gauge 163, to be recorded thereby. After the pressure of the released fluid is noted, it may be drawn off through either passage 158 or 165 by opening of the respective valves 160 and 166 associated therewith.

I claim as my invention:

1. In a device adapted to be lowered into a well for obtaining information of a condition therein, the combination of: an observation element having indicating means at the top of the well for giving evidence of an observation made of fluid in a zone in the well; a wall forming a sample receiving chamber; means operative to admit a sample of fluid into said chamber from said zone; and means having operative connection between said sample receiving chamber and the top of the well for indicating the admission of fluid from said zone into said sample receiving chamber.

2. In a device adapted to be lowered into a well for obtaining information of a condition therein, the combination of: an observation element having indicating means at the top of the well for giving evidence of an observation made of fluid in a zone in the well; a wall forming a sample receiving chamber normally excluding a sample therefrom; means operative to admit a sample of fluid into said chamber from said zone; means having operative connection between said sample receiving chamber and the top of the well for indicating the admission of fluid from said zone into said sample receiving chamber; and means for holding said sample in said chamber under the pressure at which said sample has been received.

3. In a device adapted to be lowered into a well for obtaining information of a condition therein, the combination of: an observation element having associated indicating means at the top of the well for advising of an observation made in a zone in the well; walls forming a chamber associated with said observation element, said chamber having an opening for passage of fluid; valve means for said opening; time controlled means operating to actuate said valve means; and indicating means forming a part of said device for showing when said valve means is actuated, said indicating means having an associated part at the top of the well to give sensible indication of the actuation of said valve means.

4. In a device adapted to be lowered into a well for obtaining information of a condition therein, the combination of: a supporting member adapted to be lowered into the well; a pair of electrodes carried by said supporting member; electrical means associated with said electrodes for making an observation of characteristics of a fluid contacted by said electrode in the well, said electrical means including circuit conductors connected to said electrodes and indicating means at the top of the well for imparting information to an observer; a vessel carried by said supporting member, said vessel having a chamber to receive a sample of fluid from said well, there being means for controlling the entry of fluid into said chamber; and means operating in response to entry of fluid into said chamber to connect said circuit conductors together whereby indication of said entry of fluid into said chamber will be accomplished.

5. In a device adapted to be lowered into a well for obtaining information of a condition therein, the combination of: a supporting member adapted to be lowered into the well; a pair of electrodes carried by said supporting member; electrical means associated with said electrodes for making an observation of characteristics of a fluid contacted by said electrode in the well, said electrical means including circuit conductors connected to said electrode and indicating means at the top of the well for imparting information to an observer; a vessel carried by said supporting means, said vessel having an opening for entry of fluid into its chamber; a valve for closing said opening; latch means for holding said valve in closed relation; time controlled means for releasing said latch means; and means operating in response to entry of fluid into said chamber to connect said circuit conductors together whereby indication of said entry of fluid into said chamber will be accomplished.

6. In a sample taking device of the character described, the combination of: walls forming a sample receiving chamber adapted to be lowered into a well, said chamber having an inlet opening; a valve for said inlet opening to prevent entry of fluid into said chamber until a desired time; means to open said valve so as to permit entry of fluid into said chamber; cooperative valve means for holding said fluid in said chamber; and means to produce a signal discernable to an observer at the top of the well that that valve has opened to permit entry of fluid into said chamber.

7. In a sample taking device of the character described, the combination of: walls forming a sample receiving chamber adapted to be lowered into a well, said chamber having an inlet opening; a valve for said inlet opening; means for opening said valve; and means responsive to pressure of fluid which has entered said chamber to produce a signal that a sample has been received into said chamber.

8. In a device of the character described, adapted to be lowered into a well, the combination of: a vertically elongated chamber member having an opening at the lower end thereof; a valve member adapted to be moved upwardly into position to close said opening; latch means for holding said valve member in raised position, said latch means comprising a lever to engage said valve member, a toggle to hold said lever in engagement with said valve member when said toggle is in extended condition and to retract said lever when it is in collapsed condition; and means for collapsing said toggle so as to release said latch means, comprising a stem to engage said toggle, a receptacle into which said stem extends, said receptacle being substantially filled with liquid and having an extendible wall portion which moves back and forth as the content of said receptacle changes in volume, and fluid controlled timing means in said receptacle having a moving part connected to said stem so as to transmit movement through said stem to collapse said toggle.

9. In a sample taking device of the character described, the combination of: walls forming a sample receiving chamber adapted to be lowered into a well, said chamber having an inlet opening; means normally excluding entry of fluid into said chamber; means for effectuating entry of a sample into said chamber; and means responsive to fluid which has entered said chamber to produce a signal that a sample has been received into said chamber.

10. In a device adapted to be lowered into a well, the combination of: walls forming a chamber member adapted to be moved to a suitable position in a well, said chamber member having a port to communicate with the exterior thereof; and control means for said port, said control means normally closing said port and having time controlled means operating to open said port at the expiration of a set period of time.

11. In a device adapted to be lowered into a well, the combination of: walls forming a chamber member adapted to be moved to a suitable position in a well, said chamber member having a port to communicate with the exterior thereof; control means for said port, said control means normally closing said port and having time controlled means operating to open said port at the expiration of a set period of time; and means operating to give a signal that said port has been opened.

12. In a device adapted to be lowered into a well, the combination of: walls forming a chamber member adapted to be moved to a suitable position in a well, said chamber member having a port to communicate with the exterior thereof; a valve for said port; means to exert a force to move said valve to open relation to said port; latch means arranged to be set so as to hold said valve in closing relation to said port; and time controlled means operative to automatically release said latch means.

13. In a device adapted to be lowered into a well, the combination of: walls forming a chamber member adapted to be moved to a suitable position in a well, said chamber member having a port to communicate with the exterior thereof; a valve for said port; means to exert a force to move said valve to open relation to said port; latch means arranged to be set so as to hold said valve in closing relation to said port; time controlled means operative to automatically release said latch means; and means operating to give a signal when said port has been opened.

GEORGE H. ENNIS.